US007978224B2

(12) United States Patent
Dobrin

(10) Patent No.: US 7,978,224 B2
(45) Date of Patent: Jul. 12, 2011

(54) MULTICAST CONTROL OF MOTION CAPTURE SEQUENCES

(75) Inventor: Bruce E. Dobrin, Altadena, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 12/726,199

(22) Filed: Mar. 17, 2010

(65) Prior Publication Data
US 2010/0171841 A1 Jul. 8, 2010

Related U.S. Application Data

(62) Division of application No. 11/467,505, filed on Aug. 25, 2006, now Pat. No. 7,701,487.

(60) Provisional application No. 60/711,849, filed on Aug. 26, 2005.

(51) Int. Cl.
H04N 7/18 (2006.01)
H04N 5/225 (2006.01)
H04N 5/232 (2006.01)

(52) U.S. Cl. .............. 348/211.11; 348/159; 348/207.11

(58) Field of Classification Search .................. 348/159, 348/207.1, 207.11, 211.3, 211.4, 211.5, 211.11, 348/211.14; 382/107
See application file for complete search history.

(56) References Cited

U.S. PATENT DOCUMENTS

| 5,550,928 | A | 8/1996 | Lu et al. | |
| 6,144,366 | A | 11/2000 | Numazaki et al. | |
| 7,539,190 | B2* | 5/2009 | Stewart et al. | 370/390 |
| 7,629,994 | B2* | 12/2009 | Dobrin | 348/139 |
| 7,767,967 | B2* | 8/2010 | Gordon et al. | 250/339.05 |
| 2001/0029523 | A1* | 10/2001 | McTernan et al. | 709/205 |
| 2001/0034788 | A1* | 10/2001 | McTernan et al. | 709/232 |
| 2001/0056477 | A1* | 12/2001 | McTernan et al. | 709/219 |
| 2004/0005004 | A1 | 1/2004 | Demos | |
| 2005/0223799 | A1* | 10/2005 | Murphy | 73/510 |
| 2006/0055699 | A1 | 3/2006 | Pearlman et al. | |
| 2006/0203096 | A1* | 9/2006 | LaSalle et al. | 348/208.14 |
| 2007/0091178 | A1* | 4/2007 | Cotter et al. | 348/159 |

OTHER PUBLICATIONS

Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.
L. Herda et al., "Using Skelton-Based Tracking To Increase The Reliability of Optical Motion Capture", Human Movement Science, 2001. http://citeseer.ist.psu.edu/herda01using.html, figures 1a and 1b, abstract, and pp. 1-3 and 19.
Eftychios Sifakis et al., "Automatic Determination of Facial Muscle Activations From Sparse Motion Capture Marker Data", ACM Transactions of Graphics (TOG), v. 24 n. 3, Jul. 2005, figure 1.
Franco, J.-S., et al., "A Distributed Approach for Real Time 3D Modeling", In Proceedings of the IEEE Workshop on Real Time 3D Sensors and Their Use. 2004.
Office Action issued in U.S. Appl. No. 11/467,506 on Sep. 18, 2008.
Office Action issued in U.S. Appl. No. 11/467,503 on Dec. 9, 2008.

* cited by examiner

Primary Examiner — John M Villecco
(74) Attorney, Agent, or Firm — Samuel S. Lee; Procopio, Cory, Hargreaves & Savitch LLP

(57) ABSTRACT

Capturing motion including: a clock configured to generate a time reference; a plurality of motion capture cameras substantially synchronized to the time reference; at least one device used in motion capture; a multicast module configured to receive the time reference, and to transmit a multicast signal, wherein the multicast signal includes information derived from the time reference to configure the at least one device to operate synchronously with the plurality of motion capture cameras; and an integration module configured to integrate device data generated by the at least one device with camera data generated by the plurality of motion capture cameras.

20 Claims, 6 Drawing Sheets

MULTICAST CONTROL OF MOTION CAPTURE SEQUENCES

CROSS-REFERENCE TO RELATED APPLICATIONS

This application is a divisional application of U.S. patent application Ser. No. 11/467,505, entitled "Multicast Control of Motion Capture Sequences," filed Aug. 25, 2006, which claimed the benefit of U.S. Provisional Patent Application No. 60/711,849, entitled "Using UDP Multicasting for Controlling the Start and Stop Sequences of Motion Capture," filed Aug. 26, 2005. The disclosures of the above-referenced patent applications are, incorporated herein by reference.

BACKGROUND

The present invention relates generally to motion capture and, more particularly, to synchronizing data acquired during asynchronous motion capture operations.

Motion capture ("MOCAP") systems are used to capture the movement of a real object or person and map it onto a computer-generated object. Such systems are often used in the production of motion pictures and video games for creating a digital representation of a person for use as source data to create a computer graphics animation. In a typical system, an actor wears a suit having markers attached at various locations (e.g., having small reflective markers attached to the body and limbs) and digital cameras record the movement of the actor from different angles while illuminating the markers.

Many MOCAP camera systems maintain synchronization to a master clock, wherein data acquired by these MOCAP camera systems are integrated with data acquired by other devices that are not synchronized to the master clock. A problem arises because aligning the data sets from the MOCAP camera system and the other devices is generally difficult due to the lack of a common reference.

Therefore, what is needed is a system and method that overcomes these significant problems found in the conventional systems as described.

SUMMARY

Implementations of the present invention include systems, methods, apparatus, and computer program for synchronizing devices related to motion capture with a MOCAP camera system, and integrating the data acquired by the devices with the data acquired by the MOCAP camera system.

A motion capture system includes: a clock configured to generate a time reference; a plurality of motion capture cameras substantially synchronized to the time reference; at least one device used in motion capture; a multicast module configured to receive the time reference, and to transmit a multicast signal, wherein the multicast signal includes information derived from the time reference to configure the at least one device to operate synchronously with the plurality of motion capture cameras; and an integration module configured to integrate device data generated by the at least one device with camera data generated by the plurality of motion capture cameras.

A method of motion capture includes: generating a time reference; substantially synchronizing a plurality of motion capture cameras to the time reference; transmitting a multicast signal including information derived from the time reference to enable at least one device used in motion capture to operate synchronously with the plurality of motion capture cameras, wherein the at least one device is enabled to operate synchronously by: estimating a device start time synchronous with a start time of the plurality of motion capture cameras using the first timecode and the delay time; receiving a device status response including device latency information; updating the delay time using the device latency information; estimating a device stop time synchronous with a stop time of the plurality of motion capture cameras, using the second timecode and the updated delay time; and integrating device data frames generated by the at least one device with camera data frames generated by the plurality of motion capture cameras; wherein transmitting a multicast signal includes: multicasting a device start signal including a first timecode and a delay time, and multicasting a device stop signal including a second timecode and the updated delay time.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Implementations of the present invention include systems and methods for synchronizing devices related to motion capture with a motion capture ("MOCAP") camera system, and integrating the data acquired by the synchronized devices with the data acquired by the MOCAP camera system. In one implementation, UDP multicasting is used to control the start and stop sequences of at least one motion capture device, which captures sequences of motion capture data. Multicasting (rather than broadcasting) generally reduces the number of packets to be transmitted.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
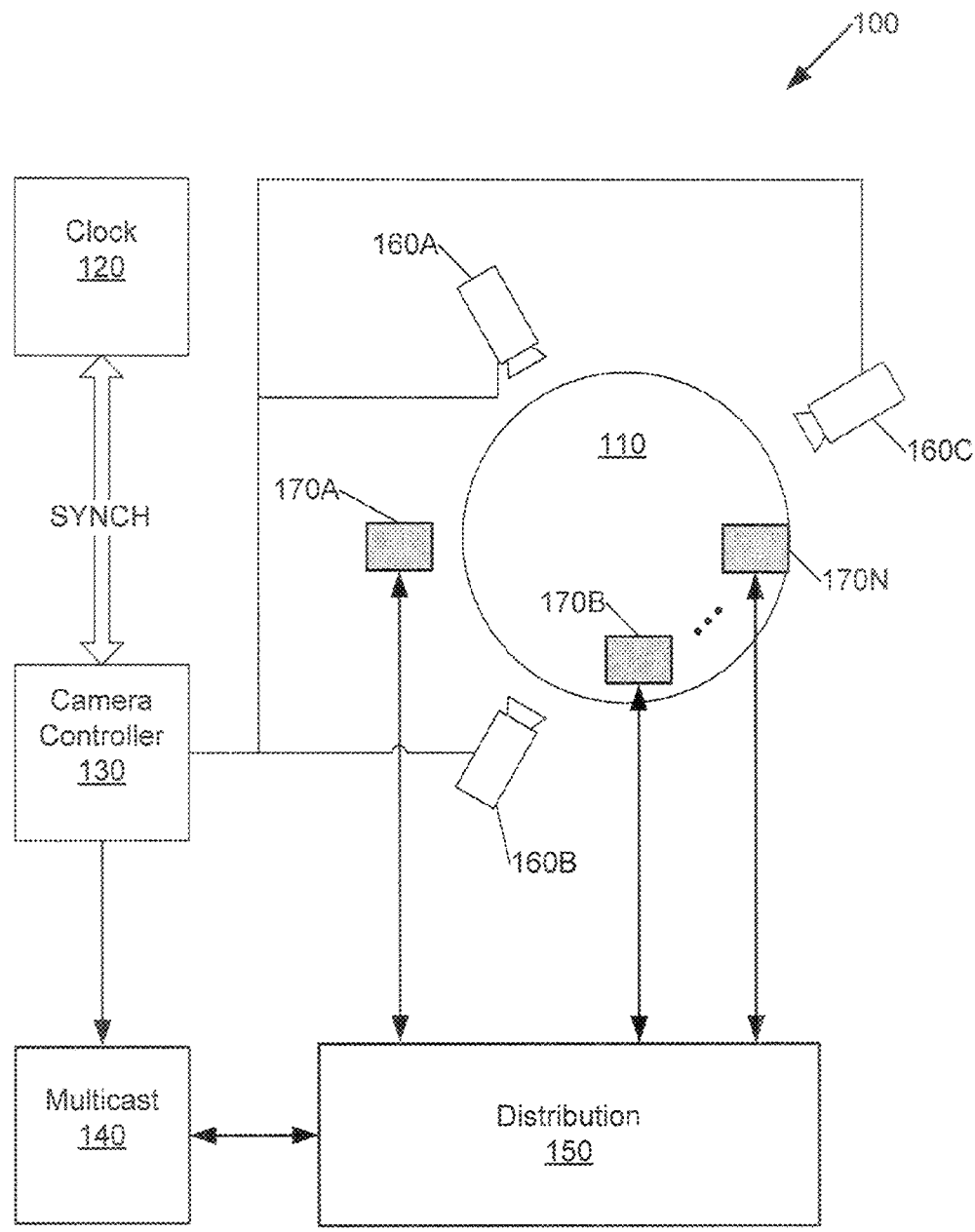
FIG. 1 is a block diagram of a motion capture system that synchronizes other motion capture devices with a MOCAP camera system.

FIG. 1 is a block diagram of a motion capture system 100 that synchronizes motion capture devices 170A-N with MOCAP cameras 160A-C. The motion capture system of FIG. 1 can be used in connection with various implementations described herein.

In the illustrated implementation of FIG. 1, the motion capture system 100 captures motion in a capture space 110 using a master clock module 120, a camera controller module 130, a multicast module 140, distribution module 150, motion capture cameras 160A-C, and other devices 170A-N. Thus, a motion capture space 110 is an area in which data are acquired by various sensors. For example, a performance in the capture space 110 by actors with attached motion capture markers is captured by MOCAP cameras 160A-C.

The camera controller module 130 receives timing information from a master clock module 120, and individually controls each MOCAP camera 160A-C. Further, the camera controller module 130 and the master clock module 120 can be synchronized using a GENLOCK ("generator lock") technique. Accordingly, the camera controller module 130 maintains precise synchronization of the frames of image data acquired by the MOCAP cameras 160A-C. If the MOCAP cameras 160A-C capture image frames at a frequency of 60 Hz, for example, then each MOCAP camera 160A-C captures an image frame of the capture space 110 synchronously at every $\frac{1}{60}^{th}$ of a second.

A number of additional devices 170A-N may be configured to operate in relation to one or more aspects of motion capture and in addition to the MOCAP cameras 160A-C. For example, a device 170B may be an electro-ocular graphing ("EOG") system for capturing actor's eyeball movement. In another example, a device 170A may generate a visual or aural stimulus alerting actors in the capture space 110 of an event such as "action" or "cut" command. In yet another example, a device 170A may be a still camera or an additional motion capture camera.

The camera controller module 130 is usually configured to provide control directives to the MOCAP cameras 160A-C. When the camera controller module 130 is triggered to begin a typical MOCAP session, the camera controller module 130: obtains a time reference from the master clock module 120; generates a control directive to the MOCAP cameras 160A-C to be executed by the MOCAP cameras 160A-C according to the time reference; and generates a signal, including information regarding the control directive and time reference, that is received by the multicast module 140.

The signal generated by the camera controller module 130 for the multicast module 140 can include a pre-start or pre-stop signal, each including a timecode based on the time reference. The multicast module 140 can then multicast a start signal derived from the pre-start and a stop signal derived from the pre-stop signal. The multicast signal includes the timecode and information for configuring the devices 170A-N to execute a function at a time estimated to synchronize with execution of the control directive by the MOCAP cameras 160A-C.

The devices 170A-N, in one implementation, are configured to "listen" for multicast signals generated at the multicast module 140. Thus, the devices 170A-N typically respond to a multicast start signal after a delay due to various latencies, including internal latencies and other latencies related to the multicast. In another implementation, the devices 170A-N are configured as a "group" of devices. Thus, in this implementation, a "group latency" is determined and used to adjust the start times of a group of devices 170A-N to minimize individual latencies of the devices 170A-N and efficiently synchronize with the MOCAP cameras 160A-C.

In one implementation, when a multicast start signal is received by a device 170A-N, the device can respond with a status signal to the multicast module 140 indicating that it has received the multicast start signal. In another implementation, the multicast module 140 determines a group latency using a statistical analysis of the various status responses of the group of devices 170A-N.

When the camera controller module 130 is triggered to end a MOCAP session, the camera controller module 130: obtains a time reference from the master clock module 120; generates a control directive to stop the MOCAP cameras 160A-C, to be executed according to the time reference; and generates a pre-stop signal for the multicast module 140. The pre-stop signal may include a timecode.

The multicast module 140 derives a multicast stop signal from the pre-stop signal generated by the camera controller module 130, and multicasts the multicast stop signal. A timecode can be included in the multicast stop signal to estimate a time at which to stop the devices 170A-N in synchronization with the time at which the MOCAP cameras 160A-C are to stop. The devices 170A-N are thus enabled to start and stop synchronously with the MOCAP cameras 160A-C, which are themselves substantially synchronized to the master clock module 120.

The distribution module 150 represents a multicasting link. In one implementation, the distribution module 150 is an IP network, including wired and wireless networks, over which User Datagram Protocol ("UDP") packets are sent. The UDP packets are generally small in size and can be addressed to a group. A UDP does not require a response on receiving a packet, which operates to reduce network latency. It will be appreciated that other communication protocols can be used in conjunction with various types of distribution links (e.g., distribution module 150).

Figure 2:
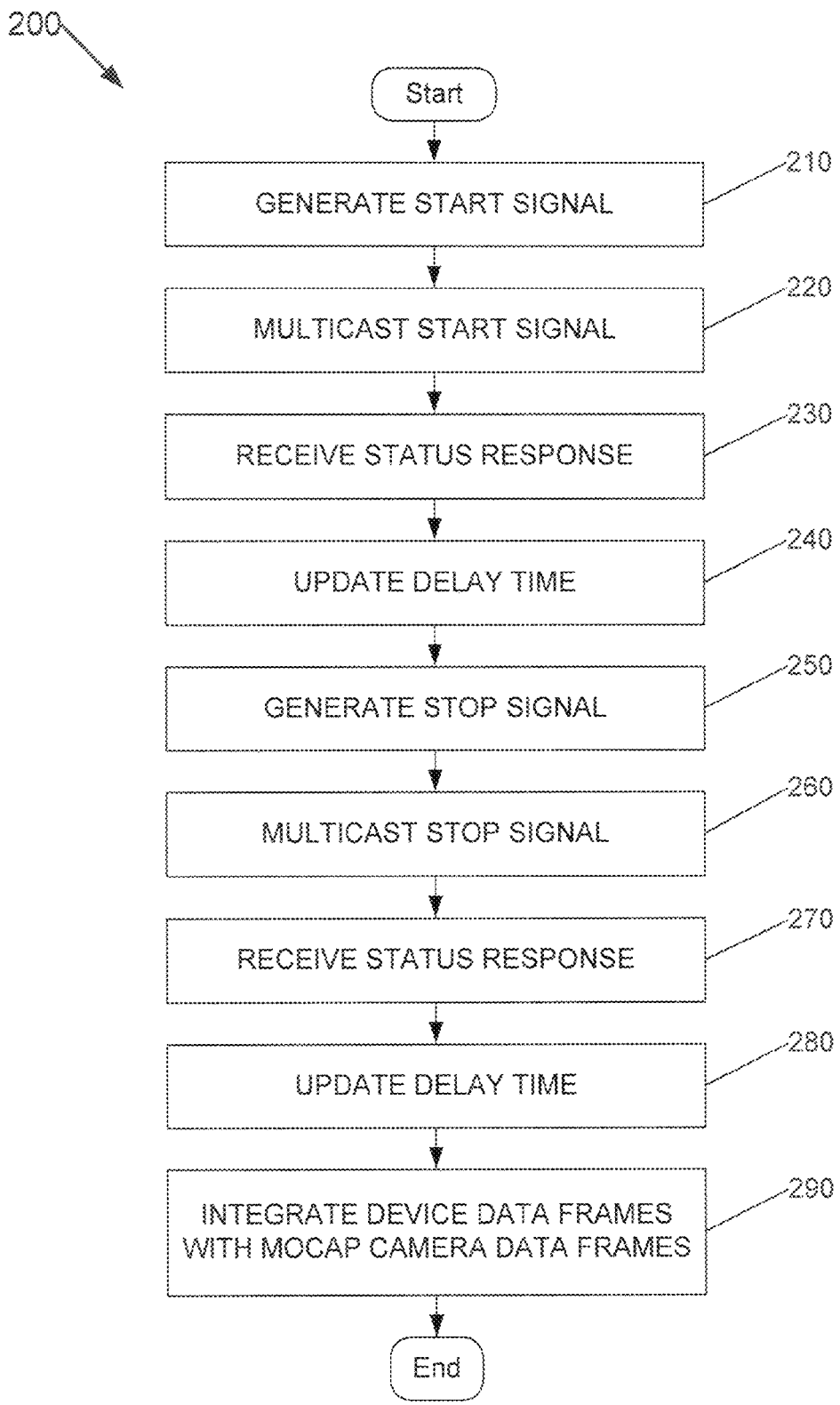
FIG. 2 is a flowchart illustrating a method for synchronizing data captured using a MOCAP camera system with data captured using other devices.

FIG. 2 is a flowchart 200 illustrating a method of synchronizing data captured using a MOCAP camera system with data captured using other devices. In the illustrated implementation, a start signal including timecode and delay time is generated, at 210, and multicast, at 220. In one implementation, the start signal includes a UDP packet that is multicast onto an IP network. The timecode included in the start signal represents a time offset indicating a future time at which synchronized devices (e.g., MOCAP cameras 160A-C) are scheduled to start operation. The UDP packet further includes a start code and a delay time corresponding to a "group latency" as discussed above.

At 230, a status response is received. In one implementation, a status response is received from each device receiving the multicast signal and is used to update the estimate of the group latency, at 240. This estimate can then be incorporated into subsequent multicast signals as the delay time.

When the device is to stop operations, a stop signal is generated including timecode and delay time, at 250. The stop signal is multicast, at 260. In one implementation, the signal includes a UDP packet that is multicast onto an IP network.

At 270, a status response is received. As discussed above, a status response received from each device receiving the multicast signal can be used to update the estimate of the group latency, at 280. This estimate can then be incorporated into subsequent multicast signals as the delay time.

Figure 3:
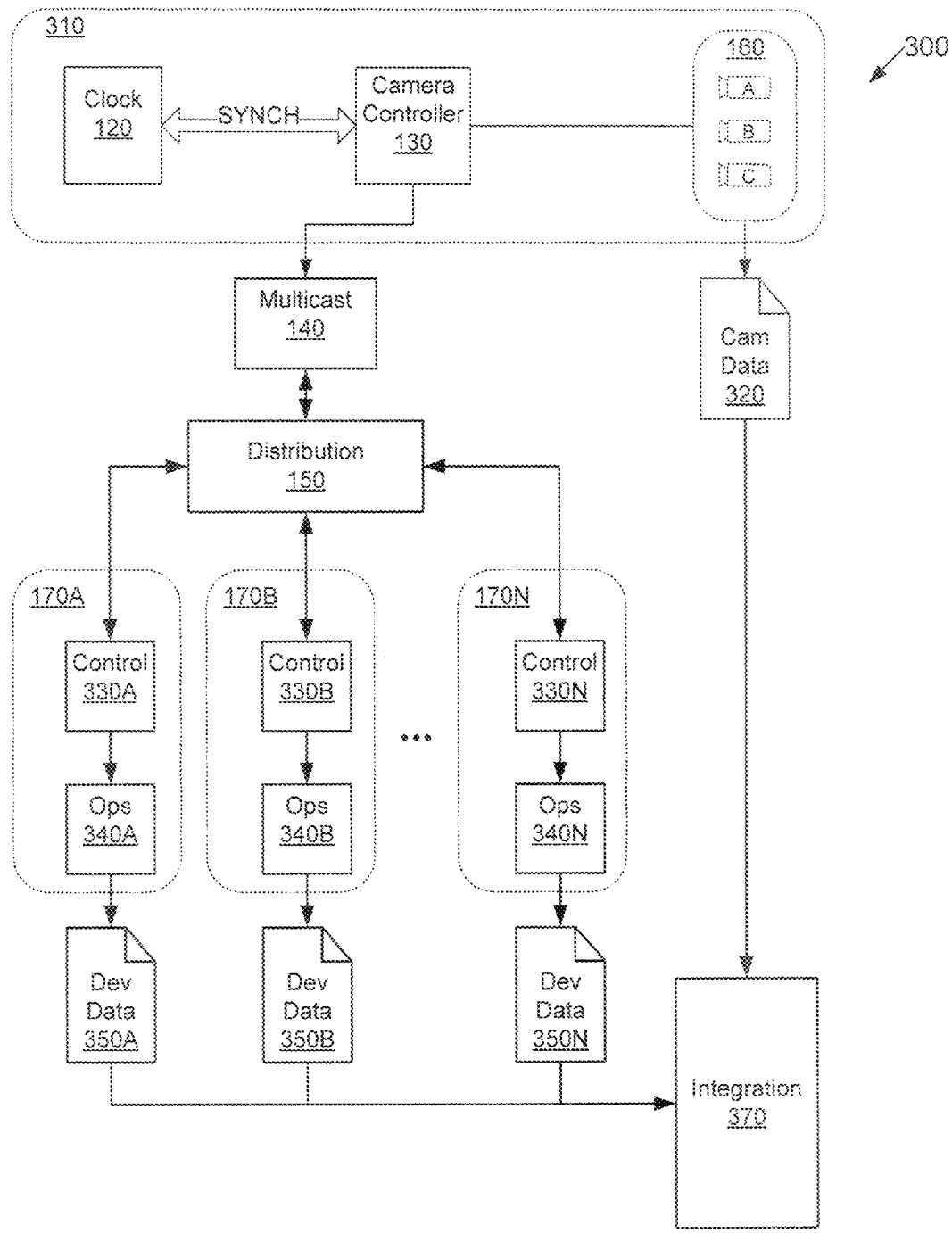
FIG. 3 is a block diagram of a system that synchronizes data captured using a MOCAP camera system with data captured using other devices.

Data frames acquired by the device ("device data") are integrated with data acquired by a MOCAP camera system, at 290. In one implementation, timestamps labeling frames of the device data are matched with timestamps labeling frames of data acquired by a MOCAP camera system 310, as shown in FIG. 3. When the device data are sampled at a higher rate ("high rate" frames) in relation to the data of a MOCAP camera system 310 ("low rate" frames), a plurality of high rate frames generally corresponds with a single lower rate frame. One of matching high rate frames can then be selected to match with the low rate frame.

FIG. 3 is a block diagram of another example motion capture system 300 wherein data captured using a MOCAP camera system 310 are synchronized with data captured using other devices 170A-N. In the illustrated implementation of FIG. 3, the motion capture system 300 includes a MOCAP camera system 310, a multicast module 140, a distribution module 150, motion capture related devices 170A-N, and an integration module 370. The MOCAP camera system 310 comprises a master clock module 120, a camera controller module 130, and MOCAP cameras 160A-C, as depicted in FIG. 1.

As described above, the camera controller module 130 synchronizes with the master clock module 120, and provides synchronization control to MOCAP cameras 160A-C. The synchronization ensures that some or all of the cameras 160A-C capture image frames at substantially the same time. The camera controller module 130 also provides triggering information related to starting and stopping the synchronized camera system 310. The MOCAP cameras 160A-C generate camera data 320.

The multicast module 140 receives triggering information (e.g., pre-start information) from the camera controller module 130 indicating when the MOCAP cameras 160A-C are scheduled to start up. The multicast module 140 generates a multicast start signal and multicasts it using the distribution module 150.

As discussed above, the distribution module 150 can be an IP network, and the start signal can be a UDP packet. Other modes of distribution and other protocols may be used. The multicast start signal includes a start code, a timecode, and a delay time. The start code indicates that the signal is a start signal. The timecode provides information as to the time at which the MOCAP cameras 160A-C of the MOCAP camera system 310 are scheduled to start. The delay time approximates a group latency. For example, the delay time is the result of a statistical analysis, such as an average, of the individual latencies associated with devices 170A-N. In one implementation, a multicast start signal includes a timestamp for labeling a frame of data.

The devices 170A-N receive the multicast start signal transmitted through the distribution module 150. Each device 170A-N includes a control module 330A-N and an operational module 340A-N. The control modules 330A-N are configured to receive signals, such as multicast start and stop signals, from the distribution module 150, and provide control inputs to the operational modules 340A-N, including those for starting and stopping the operational modules 340A-N. In general, a control module 330A-N includes any device operable to receive a multicast signal. In one implementation, the control modules 330A-N include "pocket PC" type computers configured to receive UDP packets on an IP network (i.e., via the distribution module 150). Additionally, the control modules 330A-N can be configured for wireless or wired communications. In another implementation, the control modules 330A-N are wearable devices worn by actors.

The control modules 330A-N also determine triggering times for starting the operational modules 340A-N according to the timecode received in a multicast start signal. In one implementation, the timecode represents a duration after which the MOCAP cameras 160A-C of the MOCAP camera system 310 are to begin operating. The delay time, representing the group latency, is subtracted from the timecode, yielding a time offset. Applying the time offset to the current time (according to the internal clock of the control module 330A-N) provides a future time at which the operational module 340A-N is triggered, wherein the future time is substantially synchronized with the time at which the cameras 160A-C are scheduled to begin operating.

The operational modules 340A-N provide a variety of functions for the corresponding devices 170A-N, such as capturing motion, capturing still images, alerting actors in the motion capture space, and so on. In one example, a still camera is used to capture an image of the capture space at the beginning and end of a motion capture session. An actor alert device can be triggered at the beginning of a motion capture session to instruct the actors to begin performing, similar to the function of a "clapper" on a movie set. In another example, the operational modules 340A-N include an electro-ocular graphing ("EOG") system for tracking an actor's eyeball movements.

The devices 170A-N generate device data 350A-N as output. The device data 350A-N include data frames labeled (i.e., timestamped) according to a timecode derived from information in the start signal. The data frames are also bracketed by start and stop timestamps so that interim data frames can be timestamped using the data frame rate to subdivide the period between the bracketing start and stop times. For example, if the start time is at 10 seconds and the frame rate is 60 Hz, the $30^{th}$ frame from the start is timestamped to indicate 10.5 seconds, corresponding to 30 frames, each acquired at $\frac{1}{60}^{th}$ second intervals.

In the illustrated implementation of FIG. 3, the device data 350A-N are integrated with the camera data 320 at the integration module 370 according to timestamps labeling the data frames. For example, the device data 350A-N are synchronized with the camera data 320 by matching respective timestamps. As will be explained in more detail below, when the device data 350A-N are oversampled in relation to the camera data 320, at least one sample (i.e., frame) of the device data 350A-N can usually be aligned with each sample (frame) of the camera data 320.

Figure 4:
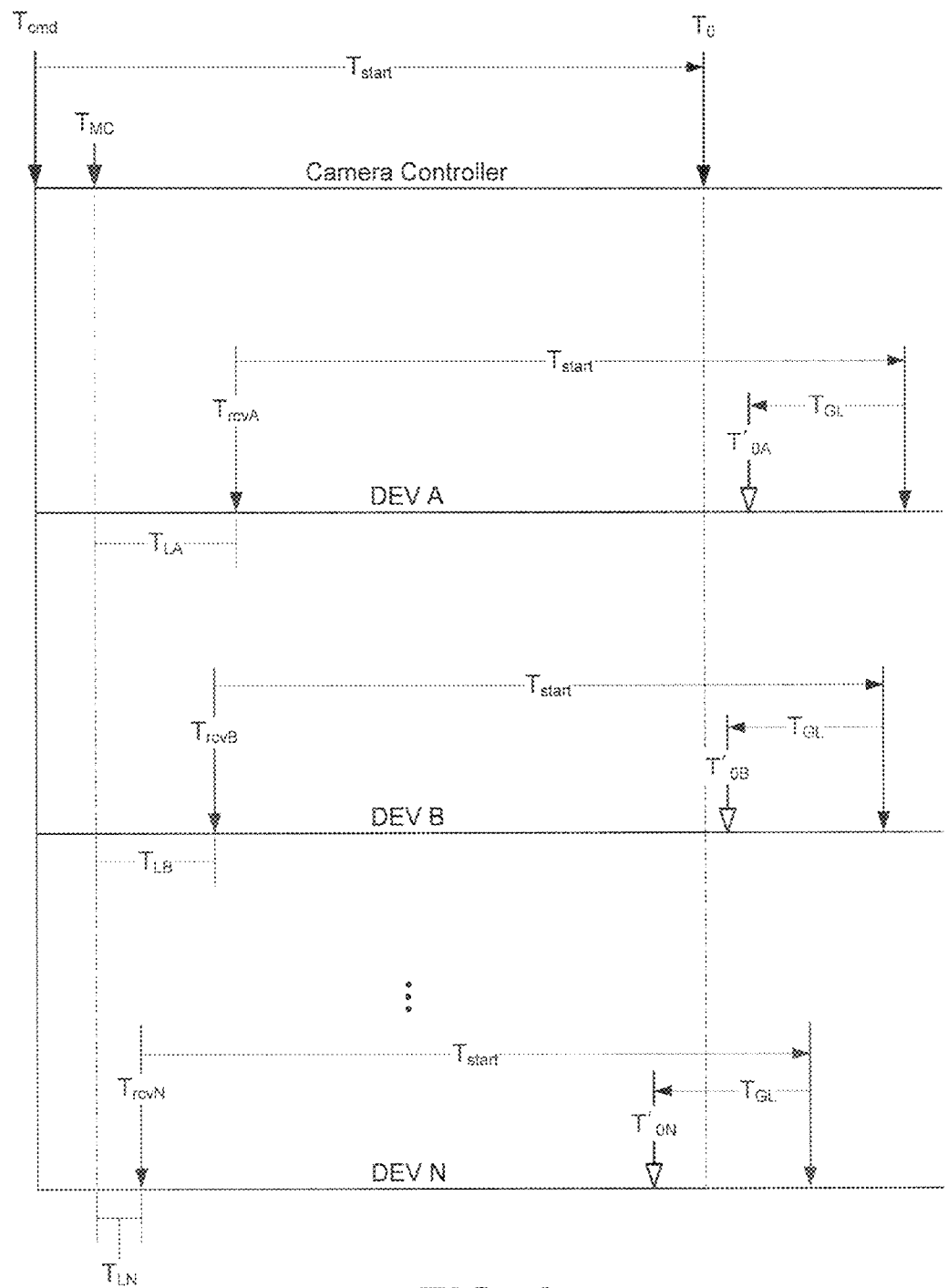
FIG. 4 is a diagram illustrating a method of determining device start times from a multicast start signal.

FIG. 4 is a diagram illustrating a method of determining device start times from a multicast start signal. Respective device start times can be compared using timelines for a camera controller (such as the camera controller module 130) and N motion capture related devices (such as devices 170A-N). The camera controller is synchronized with a clock (such as a master clock 120).

At time $T_{cmd}$, the camera controller is triggered, which initiates a synchronized start of MOCAP cameras under its control (such as MOCAP cameras 160A-C). The triggering of the camera controller at $T_{cmd}$ determines a start time $T_0$, which occurs $T_{start}$ time later. During the time leading up to $T_0$, the MOCAP cameras prepare for operation. At time $T_0$, the cameras are started. As an example, $T_{start}$ can be approximately equal to the time required for the MOCAP cameras to acquire five frames of data. At a 60 Hz frame rate, acquiring five frames of data thus requires $\frac{5}{60}=\frac{1}{12}^{th}$ of a second. The camera controller also configures a pre-start signal for a multicast module 140 (see FIGS. 1 and 3), including a timecode representing $T_{start}$ and a delay time $T_{GL}$ representing the group latency. The multicast module 140 configures a multicast start signal, including $T_{start}$ and the delay time $T_{GL}$, that is multicast at time $T_{MC}$.

As shown on the timeline for a device DEV A, the multicast start signal, including $T_{start}$ and $T_{GL}$, is received at time $T_{rcvA}$ according to an internal clock of the device DEV A. $T_{start}$ is added to $T_{rcvA}$, from which the group delay $T_{GL}$ is then subtracted, yielding an estimated start time $T'_{0A}$ to synchronize with the start time $T_0$ of the MOCAP cameras. When operation of the device DEV A starts, the first frame of data is timestamped using the same value for $T_0$ that is used at the camera controller. The latency of this device is $T_{LA}$. $T_{GL}$ is subtracted from $T_{start}$ to compensate for $T_{LA}$. If $T_{GL}$ were equal to $T_{LA}$, then the start time $T'_{0A}$ for the device would be equal to the start time $T_0$ of the camera controller. $T'_{0A}$ is therefore accurate as an estimate of $T_0$ to the extent that $T_{GL}$ approximates $T_{LA}$. In one implementation, $T_{GL}$ is determined using a statistical analysis of the individual latencies of the devices included in the group. In one example, $T_{GL}$ is an average of the individual device latencies.

Similarly for a device DEV B, the multicast start signal including $T_{start}$ and $T_{GL}$ is received at time $T_{rcvB}$ according to the internal clock of the device DEV B. $T_{start}$ is added to $T_{rcvB}$, from which the group delay $T_{GL}$ is then subtracted, yielding an estimated start time of $T'_{0B}$ to synchronize with the start time $T_0$ of the MOCAP cameras. The latency of this device is $T_{LB}$. Start time $T'_{0A}$ is shown as a slightly more accurate estimate of $T_0$ than $T'_{0A}$ was because the latency $T_{LB}$ for the device DEV B is slightly less than the latency $T_{LA}$ as shown for device DEV A.

For a device DEV N, the multicast start signal including $T_{start}$ and $T_{GL}$ is received at time $T_{rcvN}$ according to the internal clock of the device DEV N. $T_{start}$ is added to $T_{rcvN}$, from which the group delay $T_{GL}$ is then subtracted, yielding an estimated start time $T'_{0N}$ to synchronize with the start time $T_0$ of the MOCAP cameras. The latency of this device is $T_{LN}$. The start time $T'_{0N}$ is shown as being prior to $T_0$ because the latency $T_{LN}$ for the device DEV N is less than the group latency $T_{GL}$.

The timelines illustrated in FIG. 4 thus describe a method, according to one implementation, of determining a start time for each device 170A-N (see FIGS. 1 and 3) that substantially synchronizes with the start time $T_0$ of a system of MOCAP cameras 160A-C.

Figure 5:
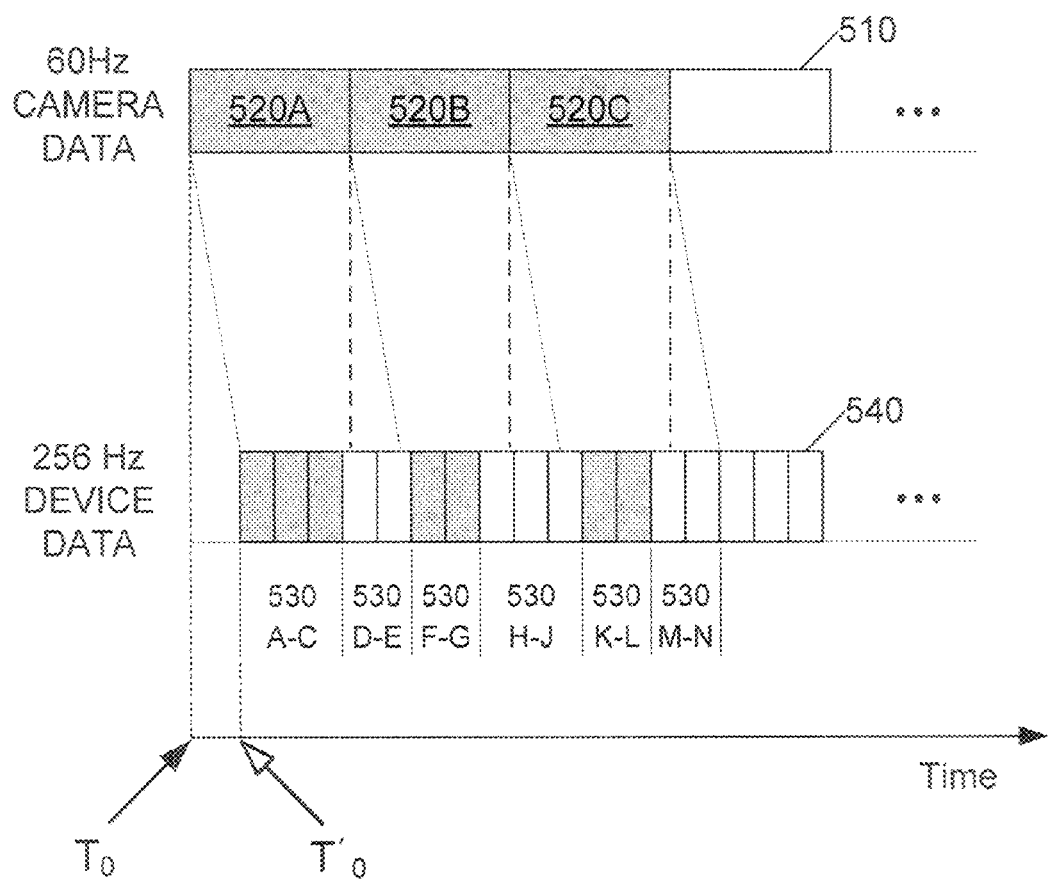
FIG. 5 is a diagram illustrating a method of synchronizing data acquired at different frame rates by a MOCAP camera system and another device.

FIG. 5 is a diagram illustrating a method of synchronizing data acquired at different frame rates by a MOCAP camera system and another device. As discussed above in relation to FIG. 3, device data 350A-N can be integrated with camera data 320. In one implementation, the cameras 160A-C acquire frames of data at a rate of 60 Hz (referred to herein as the "lower rate"). Referring to FIG. 5, a sequence of output data frames 510 of a single camera 160A, for example, begins at time $T_0$. The sequence of data frames 510 includes three typical frames 520A, 520B, 520C. Each frame in the lower rate sequence 510 has a duration of $\frac{1}{60}^{th}$ of a second, according to the 60 Hz frame rate.

A "higher rate" sequence of data frames 540 is acquired by a device such as device 170A (see FIGS. 1 and 3). In this example, the device operates at 256 Hz, which is approximately 4.27 (i.e., 256/60) times the rate of MOCAP camera 160A. In one implementation, the 256 Hz device is an EOG system. The higher rate sequence 540 starts at time $T'_0$ that was estimated (analogously to $T'_{0A}$, $T'_{0B}$, and $T'_{0N}$, for example, shown in FIG. 4) to synchronize with the start time $T_0$ of the cameras 160A-C.

In one implementation, data frames of the higher rate sequence 540 and the lower rate sequence 510 are matched to integrate the data of the two sequences 510, 540. Since the ratio of frame rates is 4.27, up to four complete frames of the higher rate sequence 540 can match with a single frame of the lower rate sequence 510. This matching is possible because up to four frames of the higher rate sequence 540 could have been acquired during the period in which a single frame of the lower rate sequence 510 was acquired.

Further, any individual frame up to four frames of the higher rate sequence 540 can be selected to integrate with the single matching frame of the lower rate sequence 510. The matching frame of the lower rate sequence 510 can be represented by any of the four higher rate frames of the higher rate sequence 540 because the matching lower rate frame is essentially an averaged "blur" of the four matching higher rate frames. Moreover, typical motions captured during an actor's performance exhibit relatively low frame-to-frame variance at a frame rate of 24 Hz, and even less frame-to-frame variance when captured at higher frame rates such as 60 Hz and above. Therefore, each of the four matching frames of the higher rate sequence 540 can be regarded alone as substantially equivalent to the single matching frame of the lower rate sequence 510 for the purposes of integrating the two sequences 510, 540.

Device latency can have the effect of reducing the number of frames of the higher rate sequence 540 that can be matched with a frame of the lower rate sequence 510. More specifically, this can occur when the difference between $T_0$ and $T'_0$ is greater than the sample period of a higher rate frame (i.e., $\frac{1}{256}$ second). This reduction is illustrated in FIG. 5.

Acquisition of the lower rate sequence 510 starts at $T_0$, and acquisition of the higher rate sequence starts slightly later at $T'_0$. The difference between $T_0$ and $T'_0$ expresses the estimation made to compensate for device latency, as discussed above (see FIG. 4). Though the two sequences 510, 540 are not aligned in "true" time (i.e., $T_0 < T'_0$), the timestamps labeling the frames of both sequences 510, 540 are in alignment. That is, higher rate frame 530A was acquired at time $T'_0$ but has a timestamp indicating $T_0$, which is same as the timestamp labeling frame 520A of the lower rate sequence 510. This alignment of timestamps facilitates the matching between the sequences 510, 540. However, the misalignment between "true" time and the assigned timestamps yields an actual match between frames 530A-C of the higher rate sequence 540 with frame 520A of the lower rate sequence. That is, only three full frames 530A-C of the higher rate sequence 540 can match with the first frame 520A of the lower rate sequence 510. Similarly, two full frames 530E-G of the higher rate sequence 540 can match with the second lower rate frame 520B, two higher rate frames 530K-L can match with the third lower rate frame 520C, and so on.

In one implementation, the sequences 510, 540 are integrated by selecting the higher rate frame having the lowest-valued timestamp from the set of higher rate frames corresponding with the matching lower rate frame. For example, three higher rate frames 530A-C match with one lower rate frame 520A. Of the three higher rate frames 530A-C, the first frame 530A has the lowest-valued timestamp. The first higher rate frame 530A is therefore selected to integrate with the lower rate frame 520A. Similarly, a higher rate frame 530F is selected to integrate with the second lower rate frame 520B, a higher rate frame 530K is selected to integrate with the third lower rate frame 520C, and so on.

By matching at least one higher rate frame to a lower rate frame, the device data 350A-N can be integrated with the MOCAP camera data 320. In one implementation, an integration module 370, as shown in FIG. 3, performs the data integration. In another implementation, tools are constructed to automatically integrate the data. It will be appreciated that other variations of this general approach may be used.

Figure 6A:
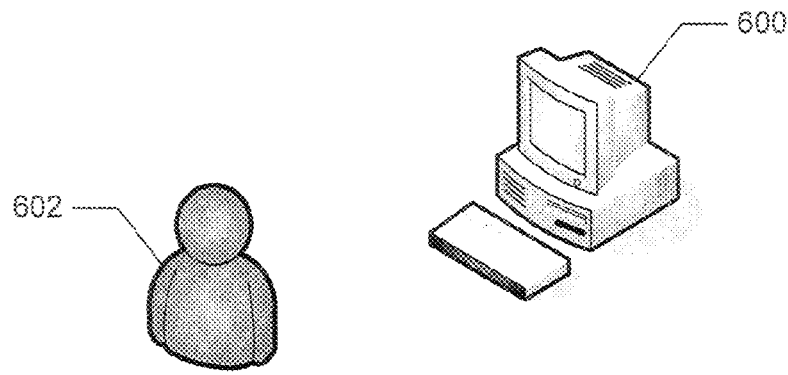
FIG. 6A shows a representation of a computer system and a user.

FIG. 6A shows a representation of a computer system 600 and a user 602. The user 602 can use the computer system 600 to process motion capture data. The computer system 600 stores and executes a motion capture system 612, which synchronizes and processes motion capture data.

Figure 6B:
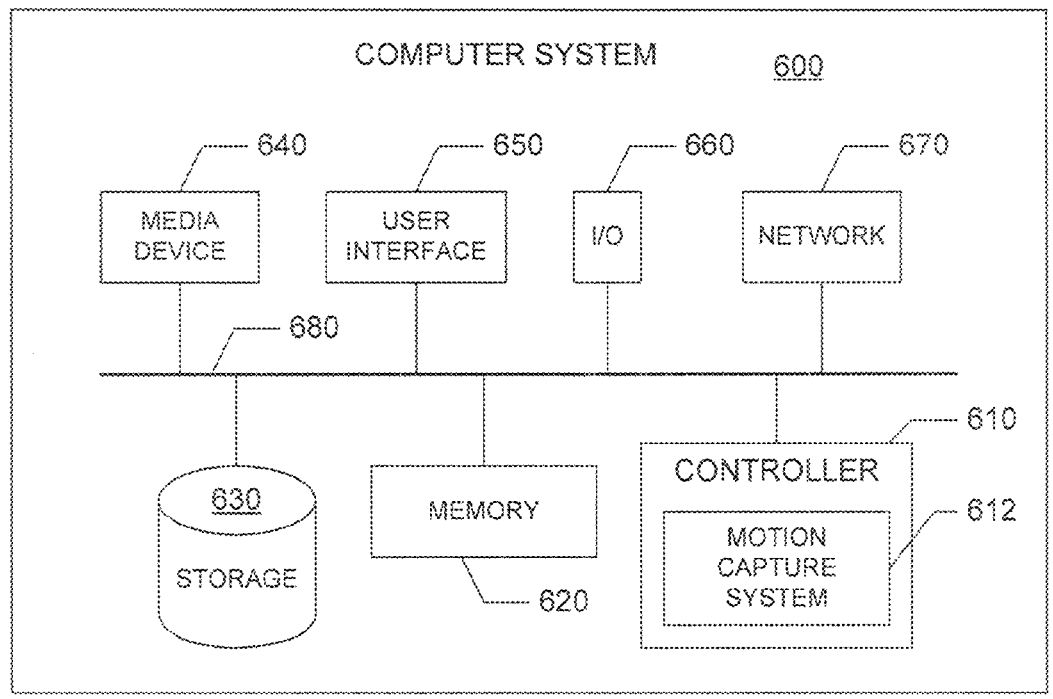
FIG. 6B shows a block diagram of one implementation of the computer system in FIG. 6A, including the motion capture system.

FIG. 6B shows a block diagram of one implementation of the computer system 600 in FIG. 6A, including the motion capture system 612. The computer system 600 includes a controller 610, a memory 620, storage 630, a media device 640, a user interface 650, an input/output (I/O) interface 660, and a network interface 670. These components are interconnected by a common bus 680. Alternatively, different connection configurations can be used, such as a star pattern with the controller at the center.

The controller 610 is a programmable processor and controls the operation of the computer system 600 and its components. The controller 610 loads instructions from the memory 620 or an embedded controller memory (not shown) and executes these instructions to control the system. In its execution, the controller 610 provides the motion capture system 612 as a software system. Alternatively, this service can be implemented as separate components in the controller 610 or the computer system 600.

Memory 620 stores data temporarily for use by the other components of the computer system 600. In one implementation, memory 620 is implemented as RAM. In one implementation, memory 620 also includes long-term or permanent memory, such as flash memory and/or ROM.

Storage 630 stores data temporarily or long term for use by other components of the computer system 600, such as for storing data used by the motion capture system 612. In one implementation, storage 630 is a hard disk drive.

The media device 640 receives removable media and reads and/or writes data to the inserted media. In one implementation, the media device 640 is an optical disc drive.

The user interface 650 includes components for accepting user input from the user of the computer system 600 and presenting information to the user. In one implementation, the user interface 650 includes a keyboard, a mouse, audio speakers, and a display. The controller 610 uses input from the user to adjust the operation of the computer system 600.

The I/O interface 660 includes one or more I/O ports to connect to corresponding I/O devices, such as external storage or supplemental devices (e.g., a printer or a PDA). In one implementation, the ports of the I/O interface 660 include ports such as: USB ports, PCMCIA ports, serial ports, and/or parallel ports. In another implementation, the I/O interface 660 includes a wireless interface for communication with external devices wirelessly.

The network interface 670 includes a wired and/or wireless network connection, such as an RJ-45 or "Wi-Fi" interface (802.11) supporting an Ethernet connection.

The computer system 600 includes additional hardware and software typical of computer systems (e.g., power, cooling, operating system), though these components are not specifically shown in FIG. 6B for simplicity. In other implementations, different configurations of the computer system can be used (e.g., different bus or storage configurations or a multi-processor configuration).

Various illustrative embodiments of the present invention have been described. However, one of ordinary skill in the art will recognize that additional embodiments are also possible and within the scope of the present invention.

Accordingly, the present invention is not limited to only those embodiments described above.

What is claimed is:

1. A motion capture system, comprising:
   a clock configured to generate a time reference;
   a plurality of motion capture cameras substantially synchronized to the time reference;
   at least one device configured to operate in relation to one or more aspects of motion capture and in addition to the plurality of motion capture cameras;
   a multicast module configured to receive the time reference, and to transmit a multicast signal,
   wherein the multicast signal includes information derived from the time reference to configure the at least one device to operate synchronously with the plurality of motion capture cameras,
   wherein the at least one device is configured to listen for the multicast signal and to respond to the multicast module with a status signal; and
   an integration module configured to integrate device data generated by the at least one device with camera data generated by the plurality of motion capture cameras.

2. The motion capture system of claim 1, wherein the multicast signal is a UDP packet.

3. The motion capture system of claim 1, wherein the multicast signal further comprises a start time and a stop time to enable the at least one device to operate synchronously with the motion capture cameras.

4. The motion capture system of claim 1, wherein the information derived from the time reference further comprises:
   a timecode; and
   a delay time representing a group latency,
   wherein the timecode and the delay time are used to estimate at least one of the start time and the stop time.

5. The motion capture system of claim 1, wherein the information derived from the time reference comprises a timestamp derived from the time reference, and the timestamp is used to label a frame of data generated by the at least one device.

6. The motion capture system of claim 1, wherein the at least one device comprises an alerting device.

7. The motion capture system of claim 1, wherein the at least one device comprises a still camera.

8. The motion capture system of claim 1, wherein the at least one device comprises an electro-ocular graphing (EOG) system.

9. The motion capture system of claim 1, further comprising
   a distribution module configured to receive the multicast signal from the multicast module and to multicast the multicast signal to the at least one device.

10. The motion capture system of claim 9, wherein the distribution module comprises an IP network.

11. A method of motion capture, comprising:
    generating a time reference;
    substantially synchronizing a plurality of motion capture cameras to the time reference;
    transmitting a multicast signal including information derived from the time reference to enable at least one device used in motion capture to operate synchronously with the plurality of motion capture cameras,
    wherein the at least one device is enabled to operate synchronously by:
        estimating a device start time synchronous with a start time of the plurality of motion capture cameras using the first timecode and the delay time;
        receiving a device status response including device latency information;
        updating the delay time using the device latency information;
        estimating a device stop time synchronous with a stop time of the plurality of motion capture cameras, using a second timecode and the updated delay time; and integrating device data frames generated by the at least one device with camera data frames generated by the plurality of motion capture cameras;
wherein transmitting a multicast signal comprises:
multicasting a device start signal including a first timecode and a delay time, and
multicasting a device stop signal including the second timecode and the updated delay time.

12. The method of claim 11, wherein the device start signal and that device stop signal are multicast onto an IP network.

13. The method of claim 11, wherein integrating device data frames comprises:
subdividing the device data frames into groups, each group substantially aligned using timestamps with a camera data frame;
selecting from said each group a complete device data frame with the lowest-valued timestamp; and
integrating the complete device data frame with the aligned camera data frame.

14. The method of claim 11, wherein the device comprises a UDP packet.

15. The method of claim 11, wherein estimating a device start time comprises:
offsetting a current time measured by an internal device clock by the first timecode; and
subtracting the delay time from the current time.

16. The method of claim 11, wherein updating the delay time comprises
performing a statistical analysis on the device latency information and a plurality of other device latencies.

17. A computer-readable storage medium storing a computer program for capturing motion, the program comprising executable instructions that cause a computer to:
generate a time reference;
substantially synchronize a plurality of motion capture cameras to the time reference;
transmit a multicast signal including information derived from the time reference to enable at least one device used in motion capture to operate synchronously with the plurality of motion capture cameras,
wherein the at least one device is enabled to operate synchronously by the program further comprising executable instructions that cause a computer to:
estimate a device start time synchronous with a start time of the plurality of motion capture cameras using the first timecode and the delay time;
receive a device status response including device latency information;
update the delay time using the device latency information;
estimate a device stop time synchronous with a stop time of the plurality of motion capture cameras, using a second timecode and the updated delay time; and
integrate device data frames generated by the at least one device with camera data frames generated by the plurality of motion capture cameras;
wherein executable instructions that cause a computer to transmit a multicast signal further comprise executable instructions that cause a computer to:
multicast a device start signal including a first timecode and a delay time, and
multicast a device stop signal including the second timecode and the updated delay time.

18. The computer-readable storage medium of claim 17, wherein executable instructions that cause a computer to integrate device data frames comprise executable instructions that cause a computer to:
subdivide the device data frames into groups, each group substantially aligned using timestamps with a camera data frame;
select from said each group a complete device data frame with the lowest-valued timestamp; and
integrate the complete device data frame with the aligned camera data frame.

19. The computer-readable storage medium of claim 17, wherein executable instructions that cause a computer to estimate a device start time further comprise executable instructions that cause a computer to:
offset a current time measured by an internal device clock by the first timecode; and
subtract the delay time from the current time.

20. The computer-readable storage medium of claim 17, wherein executable instructions that cause a computer to update the delay time further comprise executable instructions that cause a computer to
perform a statistical analysis on the device latency information and a plurality of other device latencies.

* * * * *